(12) United States Patent
Jenkins et al.

(10) Patent No.: US 9,713,323 B2
(45) Date of Patent: Jul. 25, 2017

(54) FLOAT DISPENSER

(71) Applicant: Nevin C. Jenkins, Homosassa, FL (US)

(72) Inventors: Nevin C. Jenkins, Homosassa, FL (US); Antonio LeBron, Brooksville, FL (US)

( * ) Notice: Subject to any disclaimer, the term of this patent is extended or adjusted under 35 U.S.C. 154(b) by 176 days.

(21) Appl. No.: 14/589,588

(22) Filed: Jan. 5, 2015

(65) Prior Publication Data
US 2016/0192631 A1 Jul. 7, 2016

(51) Int. Cl.
*A01K 97/02* (2006.01)
*A01K 85/01* (2006.01)
*A01K 97/04* (2006.01)
*B65D 83/00* (2006.01)
*A01K 93/00* (2006.01)

(52) U.S. Cl.
CPC .............. *A01K 97/04* (2013.01); *A01K 85/01* (2013.01); *A01K 93/00* (2013.01); *A01K 97/02* (2013.01); *B65D 83/0005* (2013.01)

(58) Field of Classification Search
CPC ......... A01K 97/02; A01K 93/00; A01K 85/01
USPC .............. 43/44.99, 42.06, 44.87, 44.9, 44.91
See application file for complete search history.

(56) References Cited

U.S. PATENT DOCUMENTS

| 2,465,127 A * | 3/1949 | Stark | ...................... | A01K 97/02 |
| | | | | 43/41 |
| 2,532,879 A * | 12/1950 | Baker | ..................... | A01K 85/16 |
| | | | | 43/42.06 |
| 2,594,387 A * | 4/1952 | Breuer | .................. | A01K 85/01 |
| | | | | 43/42.06 |
| 2,666,275 A * | 1/1954 | Smith | .................... | A01K 85/01 |
| | | | | 43/42.06 |
| 2,703,945 A * | 3/1955 | Johnson | ................. | A01K 85/01 |
| | | | | 43/42.06 |

(Continued)

FOREIGN PATENT DOCUMENTS

DE  4027737 A1 * 3/1992 ............. A01K 93/00
FR  2597718 A1 * 10/1987 ............. A01K 93/00
(Continued)

*Primary Examiner* — Darren W Ark
(74) *Attorney, Agent, or Firm* — Paul D. Bianco; Fleit Gibbons Gutman Bongini & Bianco PL (57) ABSTRACT

A dispenser for dispensing a fish attracting liquid during a fishing experience at the discretion of an angler. The dispenser includes a housing having a portion that is hollow; and a reservoir for containing a fish attracting liquid defined in the hollow portion of the housing and including a wall in common with the housing. The wall in common with the reservoir and the housing have at least one hole in communication with the housing exterior. An elongated plunger mounted in the reservoir has a portion extending outside the housing and the plunger has a piston fixed thereto intermediate its ends with a first face of the piston for contacting the fish attracting liquid in the reservoir and a second face for contacting the wall in common with the reservoir. A device is manually operable by an angler for causing the plunger to be pushed into the reservoir to force fish attracting liquid out of at least one through hole extending from the first face to the second face of the piston. The forced out liquid mixes with ambient water and passes out of the housing via at least one hole in communication with the housing exterior.

15 Claims, 6 Drawing Sheets

(56) References Cited

U.S. PATENT DOCUMENTS

| | | | | |
|---|---|---|---|---|
| 2,729,912 A * | 1/1956 | Moffett | A01K 97/02 |
| | | | 206/0.5 |
| 2,922,246 A * | 1/1960 | Mileschuk | A01K 85/01 |
| | | | 43/42.06 |
| 2,968,886 A * | 1/1961 | Cotroumpas | A01K 85/01 |
| | | | 43/44.99 |
| 3,780,467 A * | 12/1973 | Lueck | A01K 93/00 |
| | | | 43/44.99 |
| 3,835,572 A * | 9/1974 | Mounsey | A01K 85/16 |
| | | | 43/42.06 |
| 4,138,794 A * | 2/1979 | Chiodini | A01K 97/02 |
| | | | 43/43.14 |
| 4,267,658 A * | 5/1981 | Brown | A01K 97/02 |
| | | | 43/42.06 |
| 4,676,020 A * | 6/1987 | Taylor | A01K 85/16 |
| | | | 43/42.02 |
| 4,685,242 A * | 8/1987 | Stanish | A01K 97/02 |
| | | | 43/42.06 |
| 4,742,638 A * | 5/1988 | Vobejda | A01K 85/16 |
| | | | 43/42.06 |
| 4,799,328 A * | 1/1989 | Goldman | A01K 93/00 |
| | | | 43/42.06 |
| 5,155,947 A * | 10/1992 | Rivard | A01K 85/16 |
| | | | 43/42.06 |
| 5,321,906 A * | 6/1994 | Bommarito | A01K 85/01 |
| | | | 43/44.99 |
| 5,581,933 A * | 12/1996 | Bommarito | A01K 85/01 |
| | | | 43/44.99 |
| 5,720,124 A * | 2/1998 | Wentzell | A01K 97/02 |
| | | | 43/44.99 |
| 6,092,327 A * | 7/2000 | Nymann | A01K 97/02 |
| | | | 43/42.06 |
| 6,516,554 B1 * | 2/2003 | Page | A01K 97/02 |
| | | | 43/44.99 |
| 6,530,171 B2 * | 3/2003 | Stevens | A01K 97/02 |
| | | | 43/44.99 |
| 7,305,791 B2 * | 12/2007 | Patton | A01K 91/06 |
| | | | 43/4.5 |
| 7,415,792 B1 * | 8/2008 | Noble | A01K 93/00 |
| | | | 43/44.87 |
| 7,788,841 B1 * | 9/2010 | Donarummo | A01K 85/01 |
| | | | 43/42.06 |
| 2001/0047609 A1 * | 12/2001 | Orgeron | A01K 85/00 |
| | | | 43/42.31 |
| 2003/0126785 A1 * | 7/2003 | Poinski | A01K 85/16 |
| | | | 43/42.06 |
| 2006/0213114 A1 * | 9/2006 | Kumlin | A01K 93/00 |
| | | | 43/44.87 |
| 2009/0056194 A1 * | 3/2009 | Koskinen | A01K 85/16 |
| | | | 43/42.06 |
| 2010/0139148 A1 * | 6/2010 | Barker | A01K 97/02 |
| | | | 43/4.5 |
| 2010/0281755 A1 * | 11/2010 | Armour | A01K 97/04 |
| | | | 43/42.06 |
| 2011/0099884 A1 * | 5/2011 | Robinson | A01K 93/00 |
| | | | 43/43.14 |
| 2016/0029607 A1 * | 2/2016 | Mixon, III | A01K 97/02 |
| | | | 43/17.5 |

FOREIGN PATENT DOCUMENTS

| | | | | |
|---|---|---|---|---|
| FR | 2712460 A1 * | 5/1995 | | A01K 93/00 |
| FR | 2722367 A1 * | 1/1996 | | A01K 93/00 |
| FR | 2756460 A1 * | 6/1998 | | A01K 93/00 |
| FR | 2756461 A1 * | 6/1998 | | A01K 93/00 |
| FR | 2758238 A1 * | 7/1998 | | A01K 93/00 |
| FR | 2773435 A3 * | 7/1999 | | A01K 93/00 |
| GB | 2295074 A * | 5/1996 | | A01K 93/00 |
| JP | 10117650 A * | 5/1998 | | |
| JP | 10117652 A * | 5/1998 | | |
| JP | 10225253 A * | 8/1998 | | |
| JP | 11215942 A * | 8/1999 | | |
| JP | 2000083541 A * | 3/2000 | | |
| JP | 2003061534 A * | 3/2003 | | |

\* cited by examiner

FLOAT DISPENSER

BACKGROUND

Field of Invention

The present invention relates to a novel float dispenser for use with fishing tackle, and more particularly to a novel float dispenser constructed to contain and dispense a fish attractant liquid in small portions.

SUMMARY OF THE INVENTION

A novel float dispenser, used as part of fishing tackle, is hollow. A reservoir is built into the hollow interior of the float dispenser and the reservoir is filled with a fish attractant liquid. A plunger is inserted into the reservoir to force a small quantity of the fish attractant liquid out of the reservoir, via the plunger, as the plunger is pulled up into the float dispenser by an angler during a fishing experience.

DETAILED DESCRIPTION OF THE INVENTION

The novel float dispenser is shown herein in the form of a bobber. However, the novel concept is to provide a reservoir for a fish attracting liquid, and to incorporate the reservoir in a component of fishing tackle from which the liquid can be dispensed. Due to the structure of the reservoir and an associated plunger, an angler is enabled to dispense small quantities of the liquid from the reservoir into surrounding ambient water. Thus, the novel dispenser structure can be incorporated into a float, a lure or other component of fishing tackle. The function of the novel dispenser structure described herein is dispensing small quantities of a fish attracting liquid at the discretion and instigation of an angler.

The bobber illustrated in the drawings has an ovate shape and consists of a barrel 10, a cover 12, a plunger 14, a plunger guide 16, a rubber washer 18, and an O-ring 20. The barrel 10, shown in FIGS. 1-3 and 7-9, is cup shaped and consists of the lower half of the bobber's ovate shape. Barrel 10 has an open mouth 22 at its top and a flat bottom 24 from which a depending tubular skirt 26 protrudes. Skirt 26 has a central opening into which a keyway or groove 28 is formed. Surrounding the skirt 26 is a plurality of through holes 30 cut into the bottom 24 of the barrel 10. Holes 30 are spaced apart and are circumferentially distributed about the skirt 26; six holes 30 are shown for the specific bobber described. Holes 30 are sized to allow liquid, like the fish attracting liquid and ambient water to pass freely. A thread 38 is cut into the interior surface 32 of the barrel 10 about its open top 22. A right cylindrical wall 34 having a diameter approximately equal to the diameter of the bottom 24 is fixed to the interior surface 32 of barrel 10 aligned with the periphery of the bottom 24 and extending up to near the open top 22 of the barrel 10. Wall 34 is open at its top and constitutes a refillable reservoir for a fish attracting liquid, as will become clear hereinafter.

Figure 1:
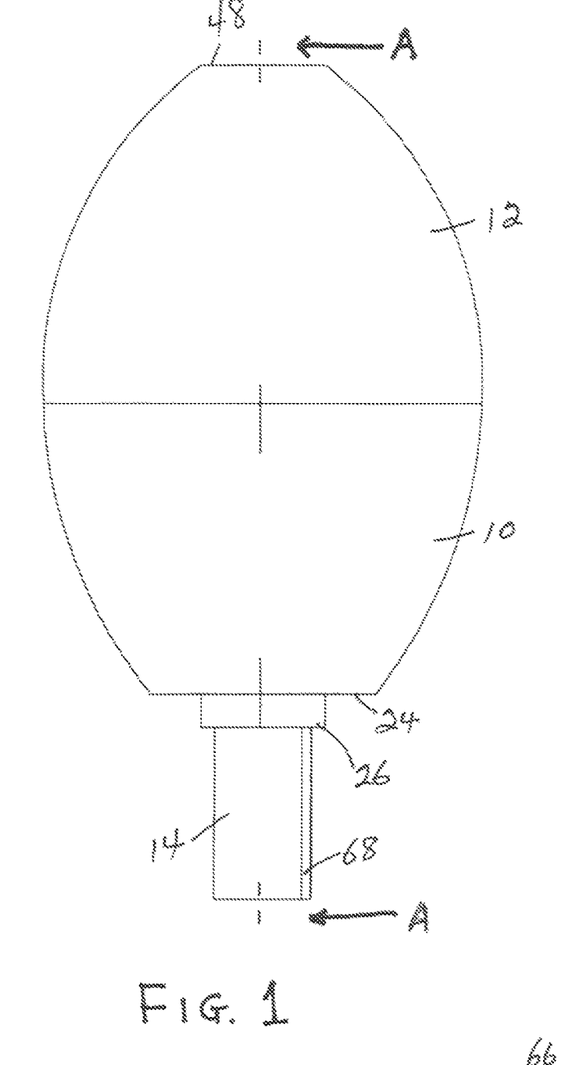
FIG. 1 is a side view of a float dispenser, in the form of a bobber, consisting of a barrel and a cover having an interior reservoir into which a plunger has been inserted.
Figure 2:
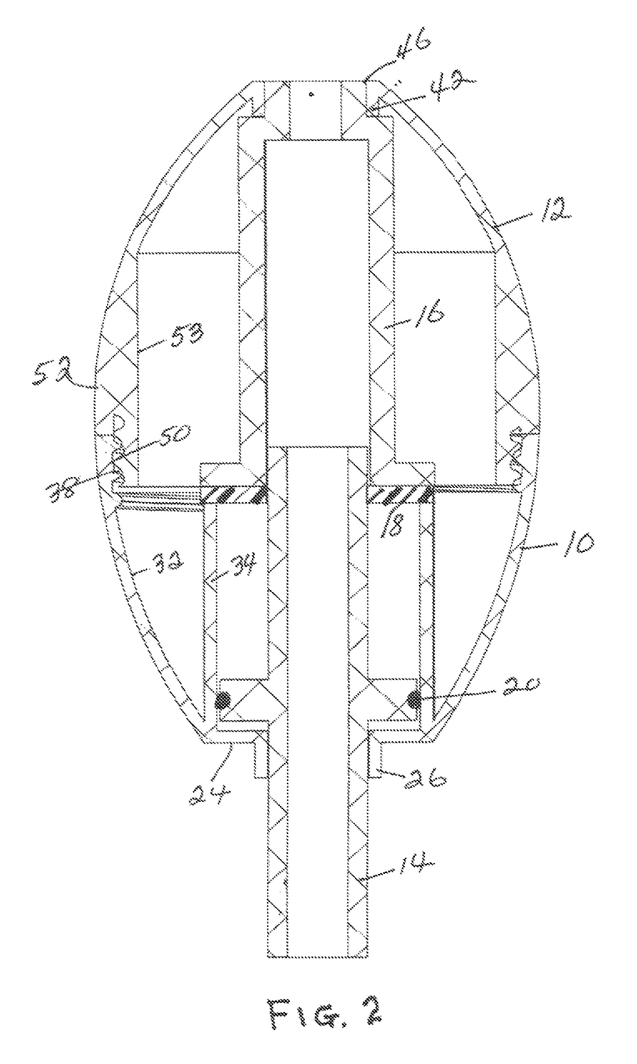
FIG. 2 is a sectional view of the float dispenser shown in FIG. 1 taken along line A-A.
Figure 3:
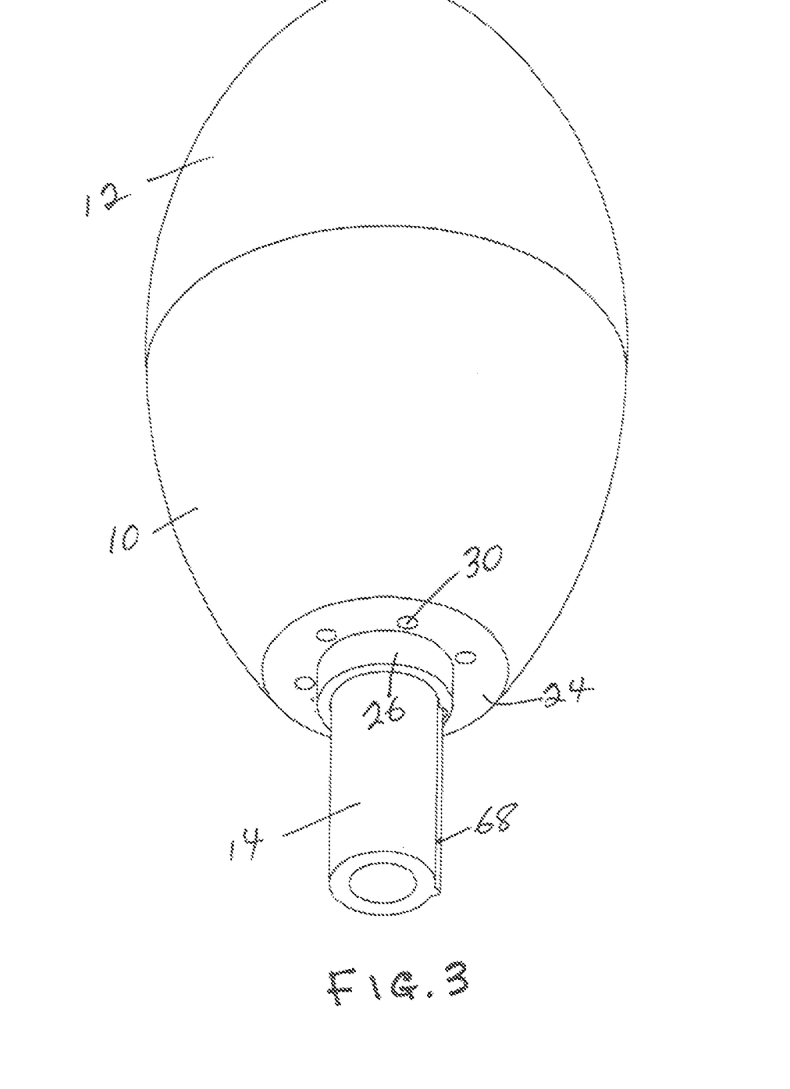
FIG. 3 is perspective view of the float dispenser shown in FIG. 1 as seen from the bottom.
Figure 4:
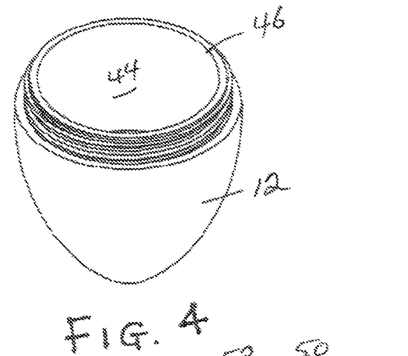
FIG. 4 is a perspective view of the cover shown in FIG. 1 as seen from the top.
Figures 5, 6:
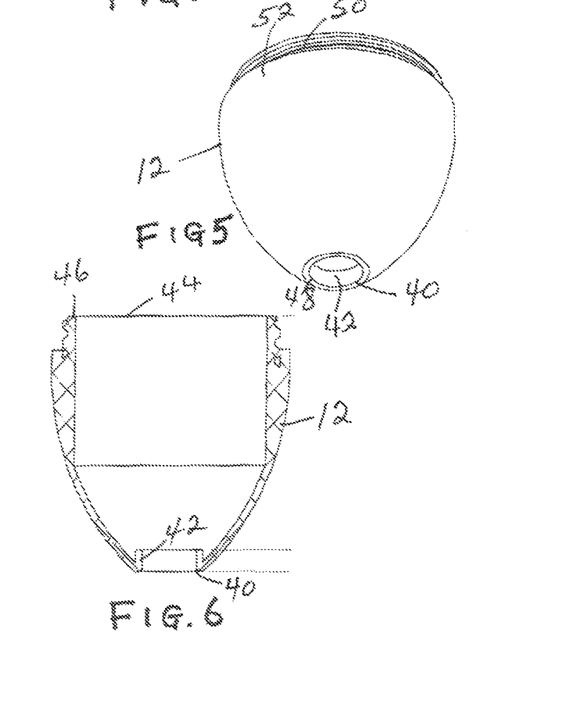
FIG. 5 is a perspective view of the cover shown in FIG. 4 as seen from the bottom.
FIG. 6 is a sectional view of the cover shown in FIG. 4 taken along its vertical mid-plane.
Figure 7:
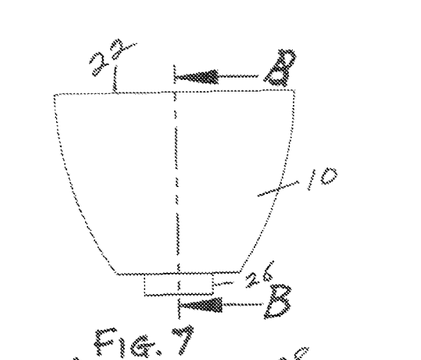
FIG. 7 is a side view of the barrel shown in FIG. 1.
Figure 8:
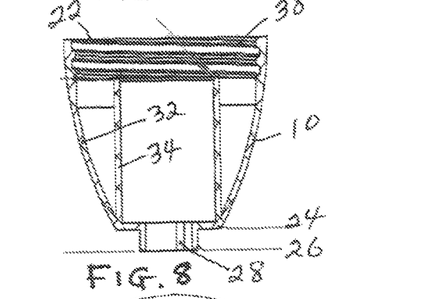
FIG. 8 is a sectional view of the barrel shown in FIG. 7 taken along line B-B.
Figure 9:
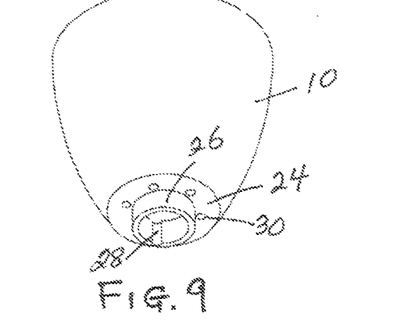
FIG. 9 is a perspective view of the barrel shown in FIG. 7 as seen from the bottom.

The cover 12, shown in FIGS. 1-6, is inverted cup shaped and consists of the upper half of the bobber's ovate shape. Cover 12 is shown in FIGS. 4-6 upside down. Cover 12 has an open mouth 44 at its bottom 46 and a circular opening 40 and a depending circular skirt or flange 42 at its top 48 that has the same diameter as the skirt 26. A thread 50 is cut into the exterior surface 52 of cover 12 that matches the threading of the barrel 10 so that when threaded together they form a smooth surface, as shown in FIGS. 1-3. To this end the interior wall 53 is thickened.

Figure 10:
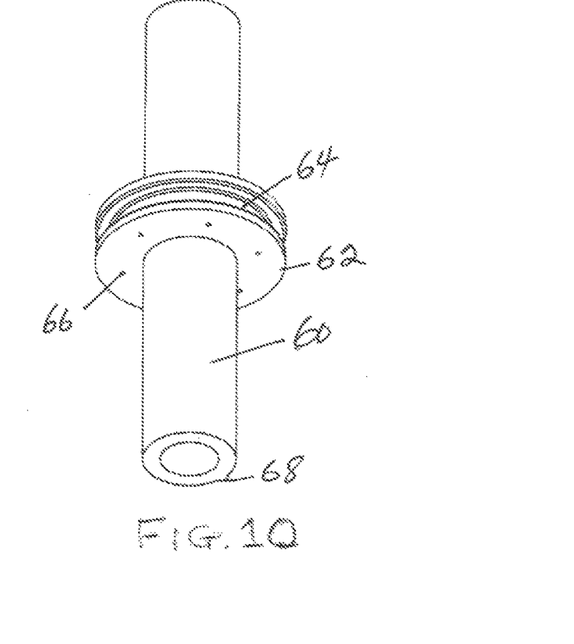
FIG. 10 is a perspective view of an elongated plunger.
Figure 11:
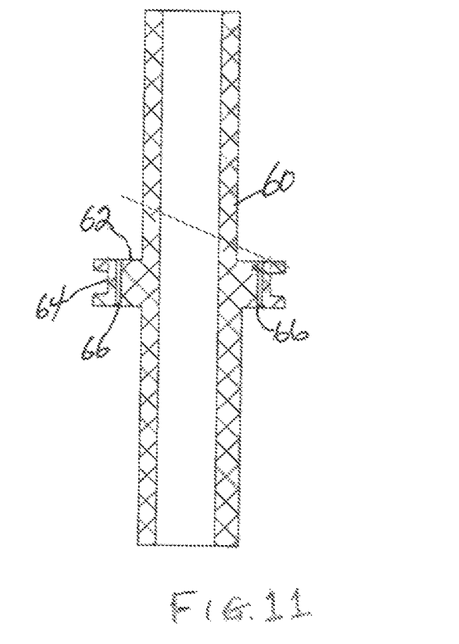
FIG. 11 is a sectional view of the plunger shown in FIG. 10 taken along its longitudinal axial.

Plunger 14 is shown in FIGS. 10 and 11 and consists of an elongated right cylindrical tube 60. About midway from its ends, tube 60 has an integrally formed flange 62 serving as a piston. The outer peripheral surface of flange 62 defines a peripheral groove 64. Between the groove 64 and tube 60 a plurality of through holes 66 are formed circumferentially spaced around the plunger. The axes of holes 66 are parallel with the longitudinal axis of tube 60. The holes 66 are sized so that the fluid in the refillable reservoir described above will not freely flow through these holes 66 but can be forced through the holes 66 by pressure. As an example, holes 66 can be about 0.015 inches in diameter. Six holes 66 are shown for the specific bobber being described. The portion of tube 60 below flange 62 is provided with an axially extending rib, spline or key 68 that cooperates with the keyway or groove 28, so that holes 66 are offset radially and/or peripherally from holes 30 in bottom 24 of barrel 10. By this means, when the lower face of piston 62 is flush with bottom 24, there is not any leakage of liquid out of the reservoir 34.

Figure 12:
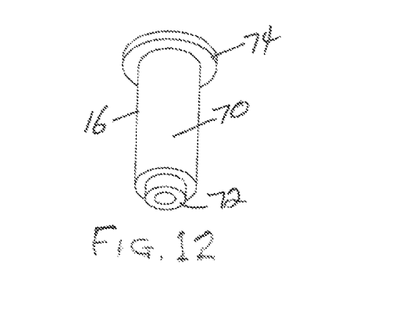
FIG. 12 is a perspective view of an elongated plunger guide mounted in the cover.
Figure 13:
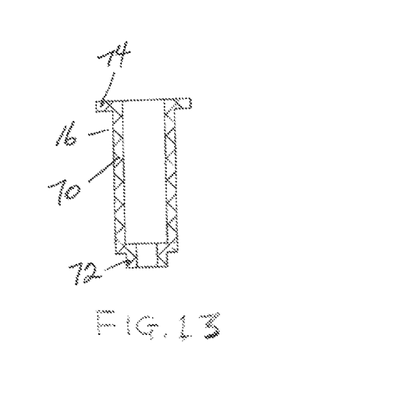
FIG. 13 is a sectional view of the plunger guide shown in FIG. 12 taken along its longitudinal axial.

Plunger guide 16, shown upside down, consists of right cylindrical tube 70 having a reduced section 72 at its top that is sized to fit into skirt 42. The bottom of tube 70 has a flange 74 that is of equal diameter of the open top of the reservoir defined by peripheral wall 34. The diameter of the plunger guide 16 enables the plunger 14 to telescope up into it.

To assemble the bobber, an O-ring 20 is placed in groove 64 of plunger 14. The plunger 14 is then inserted into the barrel 10, within the reservoir (peripheral wall 34) with the lower portion or stem of tube 60 received through skirt 26 with rib or spline or key 68 received in groove 28 whereupon the holes 66 in the flange 62 are peripherally offset from the holes 30 in bottom 24 of the barrel 10. The lower portion or stem of tube 60 is color coded to indicate by the amount of its protrusion from the skirt 26 the amount of remaining fish attracting fluid in the reservoir. The plunger 14 is pushed all the way to the bottom 24, until the lower face of flange or piston 62 is flush with bottom surface 24 of barrel 10, so that the lower portion or stem of tube 60 is pushed out of the bobber as far as possible. Fish attracting fluid is then poured into the reservoir 34 on top of the upper face of flange or piston 62 until full. A rubber washer 18 is now placed on the open reservoir 34, and the cover 12, with the plunger guide 16 fixed therein is threaded to the barrel 10 sealing the top of the reservoir by flange 74 pressing on the washer 18. A steel leader 80 passes through the assembled bobber, see FIG. 14. At the upper end 85 of the leader 80 two transparent green faceted beads 82 are mounted on the leader 80. The upper end 85 of the leader 80 is to be connected to a fishing line as generally shown by reference numeral 84. At the lower end 87 of leader 80 two gold colored beads 86 are mounted on leader 80 followed by a stop structure 88 to prevent the beads 86 from further down movement. The lower end 87 of the leader 80 is to be connected to a hook leader or some other component of tackle termination.

Figure 14:
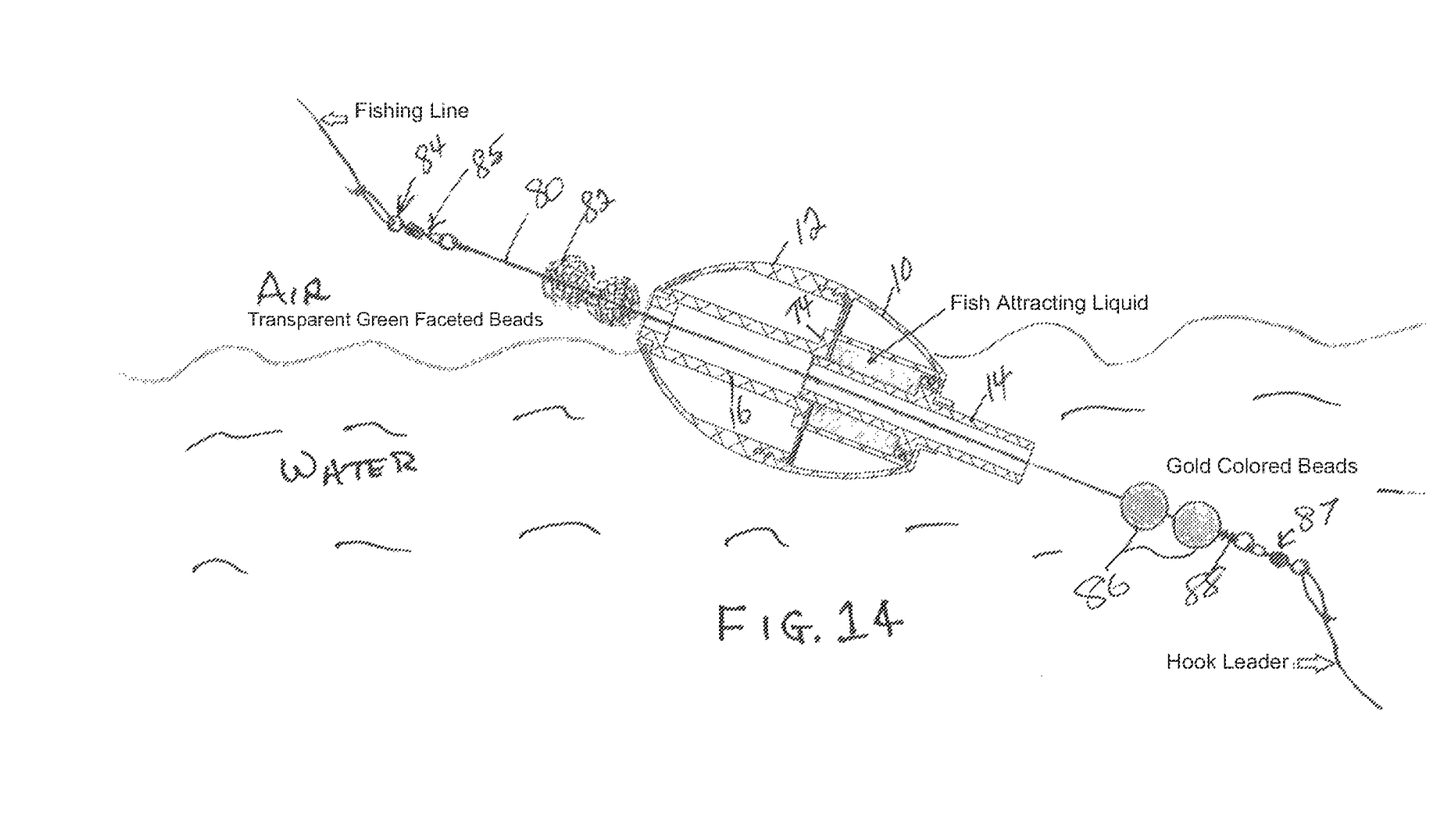
FIG. 14 shows schematically the novel float dispenser in its initial cast static state with a leader passing through the float dispenser and connected at its upper end to a fishing line, and at its lower end to a hook leader, and showing the reservoir filled with a fish attractant liquid.
Figure 15:
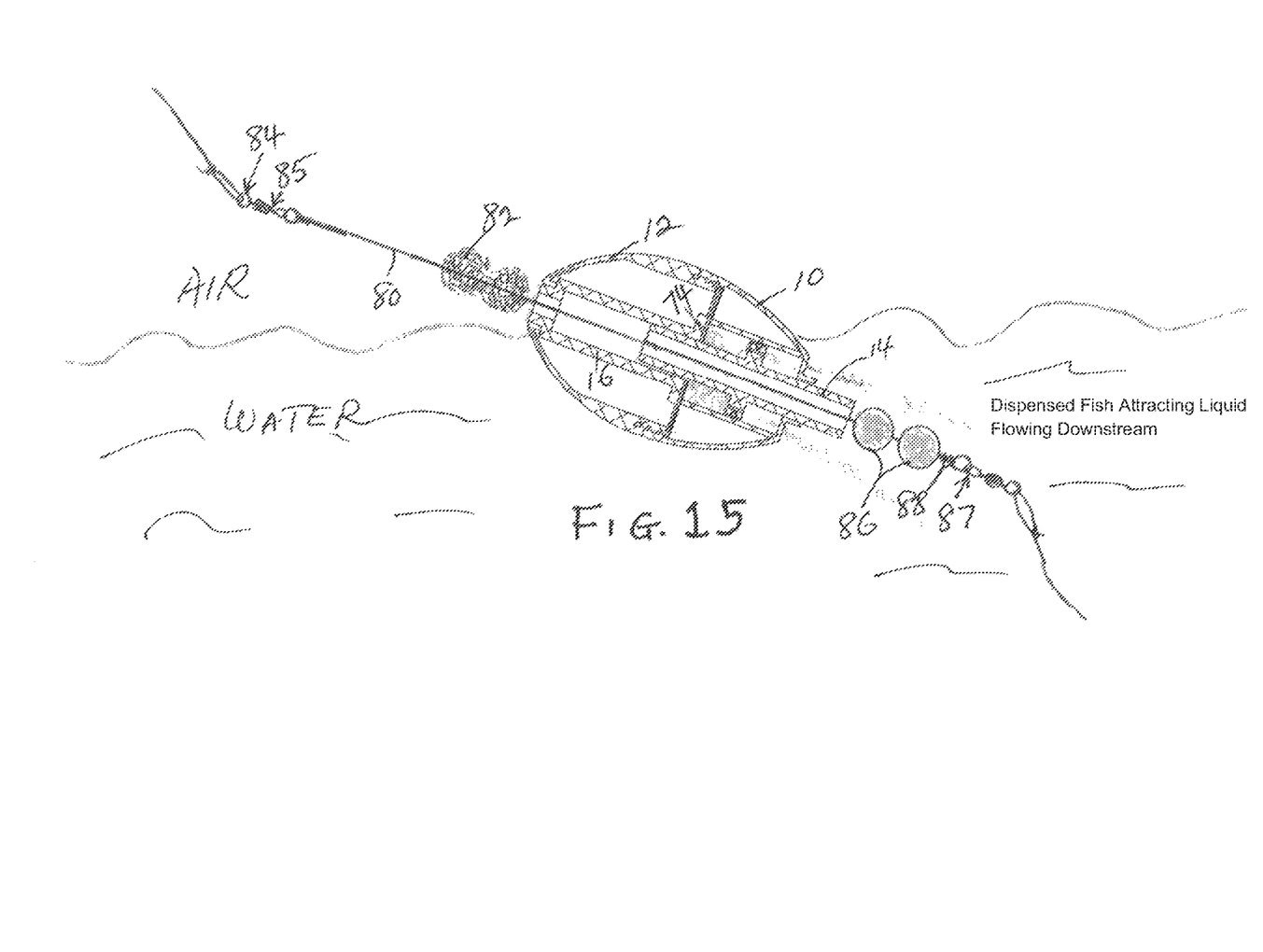
FIG. 15 shows schematically the novel float dispenser as depicted in FIG. 14, but just after the liquid has been partly dispensed due to the fishing line having been jerked by an angler forcing the steel leader that goes through the bobber to be pulled up so that gold colored beads mounted on the leader push the plunger into the barrel forcing a small quantity of fish attracting liquid through a series of holes in the plunger and enabling diffusion through the holes in the barrel bottom, where the dispensed liquid mixed with water flowing downstream.

In operation, the reservoir 34 filled with the plunger 14 at the bottom of the reservoir flush with bottom 24, is cast in a body of water to commence a fishing experience; FIG. 14 is of the initial cast showing the bobber in its initial static state. FIG. 15 is the liquid partly dispensed state showing the bobber dispensing liquid. When the fishing line is jerked by the angler, the steel leader 80 that goes through the bobber is pulled so that the gold colored beads 86 strike and push the plunger 14 into the barrel 10. As the reservoir 34 in barrel 10 is sealed by rubber washer 18 and flange 74, the gold colored beads 86 forces a small quantity of the fish attracting liquid through the plurality of holes 66 in the plunger 14. The plunger 14 comes off the bottom 24, moving slightly into the reservoir 34 equal to the dispensed liquid that is forced out of the reservoir 34. The dispensed liquid mixes with ambient water and is diffused out of the offset holes 30 in the barrel 10 where it mixes with water flowing downstream. In other words, the dispensed liquid mixes with water flowing downstream. The plunger stem of plunger 14 that is struck and pushed inwardly by the gold colored beads 86 to disperse fish attractant is color coded, e.g. green, and acts like a fuel gauge. As the green stem of plunger 14 is pushed into the bobber, one has a visual indicator of when it is time to refill the fish attractant liquid reservoir 34.

Although the novel float dispenser has been described and illustrated as a specific embodiment, nevertheless modifications and changes can be made as occur to one skilled in the art from the teachings herein. Such changes and modifications are deemed to fall within the purview of the appended claims.

What is claimed is:

1. A dispenser for dispensing a fish attracting liquid during a fishing experience at the discretion of an angler comprising:
   a. a housing having a portion that is hollow;
   b. a reservoir for containing a fish attracting liquid defined in the hollow portion of said housing and including a wall in common with the housing;
   c. said wall in common with said housing having at least one hole in communication with an exterior of the housing;
   d. an elongated plunger mounted in said reservoir having a portion extending outside the housing;
   e. said plunger having a piston fixed thereto intermediate ends thereof with a first face of the piston for contacting the fish attracting liquid in said reservoir and a second face for contacting said wall in common with said housing having at least one hole in communication with the housing exterior;
   f. said piston defining at least one through hole extending from the first face to the second face of the piston;
   g. the plunger including a cylindrical tube, the piston is a flange on the cylindrical tube;
   h. a device manually operable by an angler for causing the plunger to be pushed into the reservoir to force the fish attracting liquid out of the at least one through hole extending from the first face to the second face of the piston;
   i. whereupon the forced out liquid mixes with ambient water and passes out of the housing via the at least one hole in communication with the housing exterior.

2. The dispenser according to claim 1 wherein the portion of the plunger outside of the housing is color coded to provide an indication of a level of the liquid in the reservoir.

3. The dispenser according to claim 1 wherein said at least one hole of said wall in common with said housing further comprising a plurality of holes in communication with the housing exterior, and said at least one through hole of said piston further comprising a plurality of through holes extending from the first face to the second face of the piston, with the plurality of holes in said housing being offset from the plurality of holes in said piston.

4. The dispenser according to claim 1 wherein an outer peripheral surface of the flange defines a peripheral groove capable of receiving an O-ring.

5. The dispenser according to claim 4 further comprising the O-ring in the peripheral groove.

6. The dispenser according to claim 1 wherein the piston being a flange is an integrally formed flange on the cylindrical tube.

7. A dispenser for dispensing a fish attracting liquid during a fishing experience at the discretion of an angler comprising:
   a. a housing having a portion that is hollow;
   b. a reservoir for containing a fish attracting liquid defined in the hollow portion of said housing and including a wall in common with the housing;
   c. said wall in common with said housing having at least one hole in communication with an exterior of the housing;
   d. an elongated plunger mounted in said reservoir having a portion extending outside the housing;
   e. said plunger having a piston fixed thereto intermediate ends thereof with a first face of the piston for contacting the fish attracting liquid in said reservoir and a second face for contacting said wall in common with said housing having at least one hole in communication with the housing exterior;
   f. said piston defining at least one through hole extending from the first face to the second face of the piston;
   g. a device manually operable by an angler for causing the plunger to be pushed into the reservoir to force the fish attracting liquid out of the at least one through hole extending from the first face to the second face of the piston;

h. whereupon the forced out liquid mixes with ambient water and passes out of the housing via the at least one hole in communication with the housing exterior; and i. wherein a leader passes through the housing for connection to a fishing line and having mounted thereon an element such that when an angler jerks up the fishing line, the element strikes one of the ends of the plunger pushing it into the reservoir.

8. The dispenser according to claim 7 wherein the leader defines a stop that prevents downward movement of the element along the leader.

9. The dispenser according to claim 7 wherein the housing is in the form of a float.

10. The dispenser according to claim 7 wherein the housing is in the form of a bobber.

11. The dispenser according to claim 10 wherein the bobber is ovate shaped, and the housing includes a barrel and a cover threaded together in a releasable manner.

12. The dispenser according to claim 11 wherein the reservoir is located in the barrel.

13. The dispenser according to claim 12 wherein a top of the reservoir is sealed by a flange and washer.

14. The dispenser according to claim 11 wherein the reservoir is located in the barrel, a plunger guide having a flange at a lower end thereof is fixed in the cover and closes the reservoir via a resilient washer.

15. A method of fishing comprising the steps of:

a. providing a dispenser for dispensing a fish attracting liquid during a fishing experience at the discretion of an angler that includes a housing having a portion that is hollow; a reservoir for containing a fish attracting liquid defined in the hollow portion of said housing and including a wall in common with the housing having at least one hole in communication with an exterior of the housing; an elongated plunger mounted in said reservoir having a portion extending outside the housing with said plunger having a piston fixed thereto intermediate ends thereof with a first face of the piston for contacting the fish attracting liquid in said reservoir and a second face for contacting said wall in common with said housing having at least one hole in communication with the housing exterior; said piston defining at least one through hole extending from the first face to the second face of the piston; a device manually operable by an angler for causing the plunger to be pushed into the reservoir to force the fish attracting liquid out of the at least one through hole extending from the first face to the second face of the piston;

b. providing an angler with fishing tackle including a leader that passes through the housing for connection to a fishing line and having mounted thereon an element such that when an angler jerks up the fishing line, the element strikes one of the ends of the plunger pushing it into the reservoir;

c. filling the reservoir with the fish attracting liquid;

d. sealing the reservoir;

e. initially casting the fishing tackle in a body of water;

f. randomly jerking the fishing tackle up to cause the element to strike the one end of the plunger and force a quantity of the liquid out of the reservoir via the at least one through hole defined in said piston; and g. whereupon the forced quantity of the liquid mixes with ambient water and passes out of the at least one hole in communication with the housing exterior.

* * * * *